P. HOLLENBECK.
CHANGE SPEED GEARING.
APPLICATION FILED AUG. 5, 1914.
1,190,901. Patented July 11, 1916.
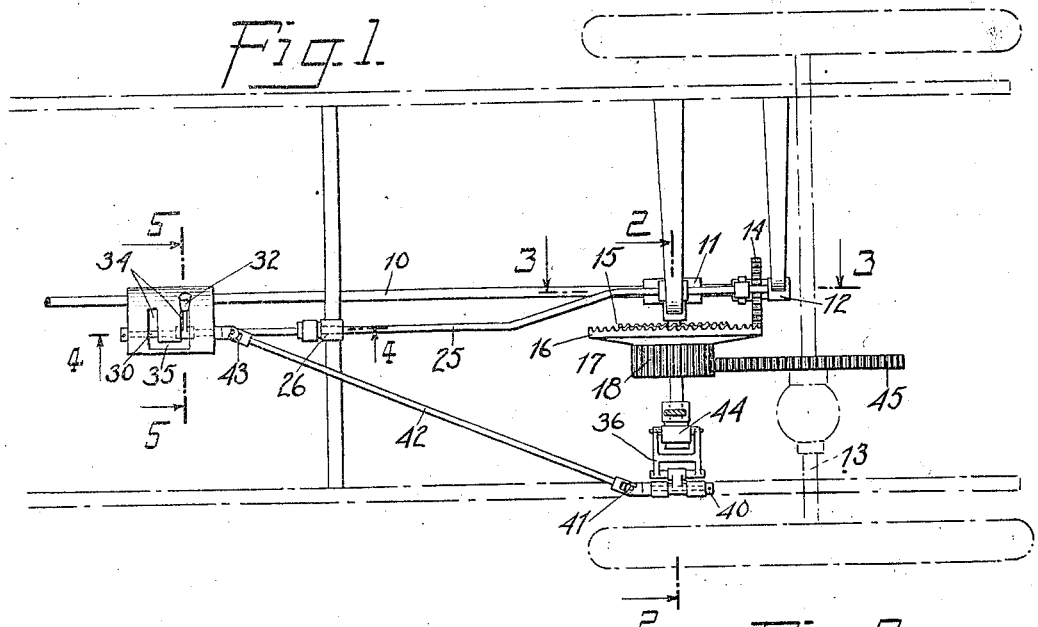
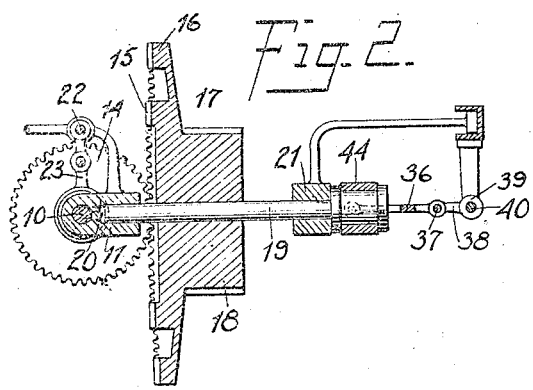
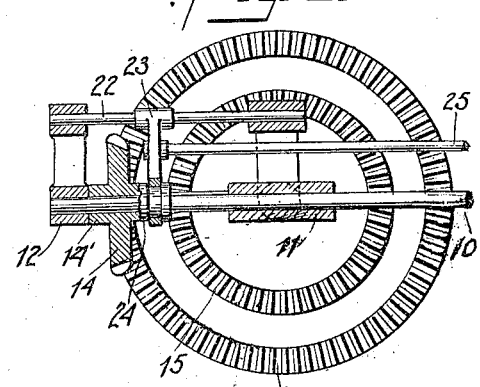
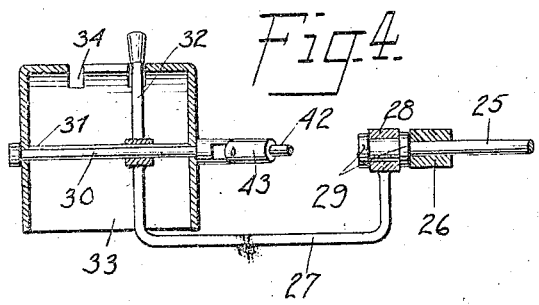
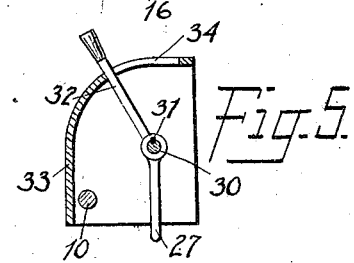
WITNESSES
George L. Blume.
Geo. L. Beeler
INVENTOR
Peter Hollenbeck
BY Munn & Co.
ATTORNEYS

UNITED STATES PATENT OFFICE.

PETER HOLLENBECK, OF KILDARE, OKLAHOMA.

CHANGE-SPEED GEARING.

1,190,901.   Specification of Letters Patent.   Patented July 11, 1916.

Application filed August 5, 1914. Serial No. 855,120.

*To all whom it may concern:*

Be it known that I, PETER HOLLENBECK, a citizen of the United States, and a resident of Kildare, in the county of Kay and State of Oklahoma, have invented a new and Improved Change-Speed Gearing, of which the following is a full, clear, and exact description.

This invention relates to transmission mechanism for various types of machinery, and has particular reference to gearing adapted especially for automobiles or other road vehicles.

More definitely stated, one of the chief objects of this invention is to provide a gear mechanism adapted for substantially a direct drive between the motor shaft and the driven axle at various speeds.

A further object of the invention is to provide a change speed mechanism, the gearing of which includes a master gear having gear wheels or members of different diameters secured thereto and adapted to coöperate selectively with a driving pinion according to the speed desired, means being provided to shift both the master gear and the pinion when making the change from one speed to another.

The foregoing and other objects of the invention will hereinafter be more fully described and claimed and illustrated in the drawings forming a part of this specification in which like characters of reference indicate corresponding parts in all the views, and in which—

Figure 1 is a plan view indicating somewhat diagrammatically the preferred embodiment of the invention; Fig. 2 is a vertical transverse section on the line 2—2 of Fig. 1; Fig. 3 is a vertical longitudinal section on the line 3—3; Fig. 4 is a similar view on the line 4—4; and Fig. 5 is a transverse sectional detail on the line 5—5.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring more particularly to the drawings I show a shaft 10 which may be treated as the driving or motor shaft journaled in stationary bearings 11 and 12 arranged on any suitable supporting means or framework. This motor shaft is shown as arranged at right angles to the driven shaft or axle 13 suggested in the drawings as constituting a rear axle of an automobile. It will be understood, however, that this is merely suggestive and it is not to be understood as limiting the scope of the invention unnecessarily; for instance, for some purposes either of the shafts just described may be regarded as the driving shaft and the other the driven shaft.

At 14 I show a driving pinion splined to and slidable along the motor shaft 10 between the fixed bearings 11 and 12. This pinion may be of any desired type and is shown adapted to coöperate selectively with a plurality of gear rings or members 15 and 16 constituting concentric portions of a compound master gear 17. While I show but two of these gear members, it is obvious that any other suitable number may be provided without departing from the principle of the invention. The master gear 17 includes also a spur gear member 18 arranged in a plane parallel to the planes of the members 15 and 16. This master gear is rigidly secured in any suitable manner to a jack shaft 19 parallel to the driven axle and journaled in a socket 20 of the fixed bearing 11 at one end and in a fixed bearing 21 adjacent its other end. The axis of the jack shaft lies in the same plane as the axis of the motor shaft and substantially at right angles thereto.

The driving pinion 14 with its sleeve 14' is adapted to be reciprocated or adjusted along the motor shaft so as to bring the pinion into mesh with either of the gear members 15 or 16. As a suitable means for accomplishing this result I provide a guide 22 parallel to the motor shaft and movable along this guide is a yoke 23 engaged in a circumferential groove 24 in one end of the sleeve 14'. A rod 25 is connected to the yoke 23 and extends in a general direction parallel to the motor shaft through a fixed bearing 26, and has connected to its front end a bail 27. The bail for this purpose is provided with an eye 28 journaled around the end of the rod 25 and maintained in position by means of collars or shoulders 29. The bail 27 constitutes one arm of a lever of the first class connected to a shaft 30 so as to slide upon the shaft but be non-rotary thereon by means of a feather or spline 31. The other arm of the lever constitutes a handle 32 whereby the lever may be rocked around the axis of the shaft 30 and move longitudinally therealong for the purpose of shifting the rod 25 and pinion 14 with respect to the axis of the master gear. The handle 32 coöperates with a casing 33 having a plurality of slots or keepers 34 corresponding to the different diameters of the gear members 15 and 16. There is also provided a communicating longitudinal slot 35 along which the handle 32 is movable during the shifting from one speed to another.

In order to provide easy shifting interchange between the driving pinion 14 and the gear members 15 and 16, it is essential, or at least desirable, that the member 15 or 16 to which the pinion is brought into mesh will not obstruct the movement of the pinion. Hence I provide suitable means to shift the master gear 17 bodily toward or from the axis of the motor shaft simultaneously with the hand controlled means for shifting the pinion. The means shown for this purpose comprises a link 36 pivotally connected at 37 to a knuckle 38 journaled in fixed bearings 39 on an axis parallel to the motor shaft. The shaft 40 to which the knuckle is connected is provided with a universal joint 41 through which the rod 42 leads to the lever shaft 30 and to which it is connected by another universal joint 43. When the shaft 30 is rotated, as when moving the handle into or out of one of the slots 34, the shaft 42 is given a corresponding rotation with the result that the knuckle 38 will be swung through an arc of a circle partially around the axis of the shaft 40 and hence causing the jack shaft and master gear secured thereto to be drawn outwardly with respect to the motor shaft along the slot 20 of the fixed bearing 11. The link 36 is pivotally connected to a collar 44 having rotary, but non-slidable, connection with the jack shaft.

With the foregoing description of the mechanism, the operation of the device may be summarized as follows: With the pinion 14 meshing with the slow speed member 16 of the master gear and adapted, therefore, for operating the driving axle of the machine through any suitable gear connections as for instance the gear 45 meshing with the spur gear 18, to change to a high speed the operator grasps the handle 32 and throws it out of the groove 34 in which it is shown located in Fig. 1, thus rotating the shaft 30, rod 42 and shaft 40. This rotation of these members causes the link 36 to draw the master gear out of mesh with the pinion 14, the spur gear 18 being wide enough to maintain its engagement with the large gear 45. The operator then slides the lever 32 along the slot 35 until it comes opposite the slot 34 and this sliding movement causes the bail 27 to draw the rod 25 and pinion 14 toward the axis of the jack shaft or into position to be in mesh with the high speed member 15 when the handle is turned into normal locking position in the latter mentioned slot 34. This last movement of the handle 32 causes the link 36 to restore the master gear into normal position to be driven by the pinion. From the construction disclosed herein it will be obvious that while the handle 32 is in the longitudinal slot 35 the pinion and master gear are out of engagement, allowing the driven shaft or axle to become idle notwithstanding the fact that the driving shaft and pinion may remain in motion.

Having thus described my invention, I claim as new and desire to secure by Letters Patent:—

1. In change speed gearing, the combination of a power shaft, a pinion splined thereon, a jack shaft arranged at an angle to the power shaft, a master gear including a plurality of gear members coöperating selectively with the pinion, and means to cause the master gear to move away from the pinion, then shift the pinion, and then return the master gear into mesh with the pinion, said last mentioned means including a rod loosely connected to the pinion and slidable substantially parallel with the power shaft, a hand lever having a bail pivotally connected to said rod and movable around the axis thereof, and a jointed shaft connected at one end to the master gear and having its other end arranged co-axially with said rod and adapted to be rotated by said lever.

2. In change speed gearing, the combination of a power shaft, a pinion slidable and splined thereon, a master gear including a plurality of gear members coöperating selectively with said pinion, and manually controlled means for throwing the master gear out of mesh with said pinion, sliding the pinion and returning the master gear with one of its gears into mesh with the pinion by a continuous operation, said manually controlled means including a jointed shaft, a casing adjacent the motor shaft and in which one end of the jointed shaft is journaled, link connections between the other end of the jointed shaft and the master gear, a lever of the first class splined and slidable upon that portion of the jointed shaft within the casing, a rod connected at one end to the pinion and having its other end arranged coaxially with that part of the jointed shaft journaled in the casing but spaced therefrom, and a bail loosely journaled upon the adjacent end of the rod and constituting a part or extension of said hand lever, substantially as set forth.

In testimony whereof I have signed my name to this specification in the presence of two subscribing witnesses.

PETER HOLLENBECK.

Witnesses:
C. S. CLARK,
Mrs. B. H. GEORGE.